Oct. 14, 1958 G. GARNIER 2,855,769
TORQUE LIMITERS WITH THERMAL RELEASE
Filed March 22, 1955 3 Sheets-Sheet 1

INVENTOR
GEORGES GARNIER
BY Toulmin & Toulmin
ATTORNEYS

Oct. 14, 1958 — G. GARNIER — 2,855,769
TORQUE LIMITERS WITH THERMAL RELEASE
Filed March 22, 1955 — 3 Sheets-Sheet 2

INVENTOR
GEORGES GARNIER
BY Toulmin & Toulmin
ATTORNEYS

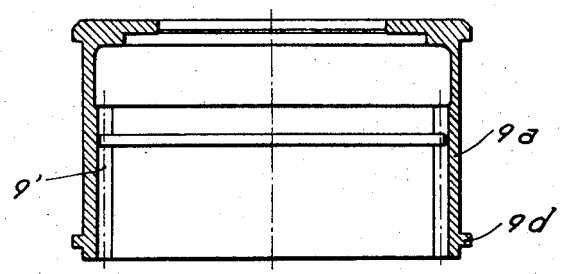
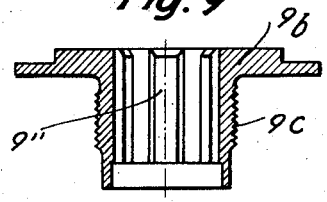
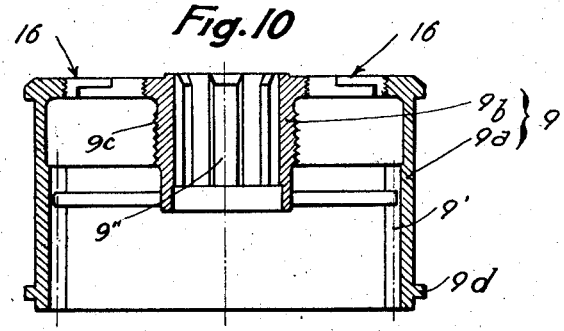
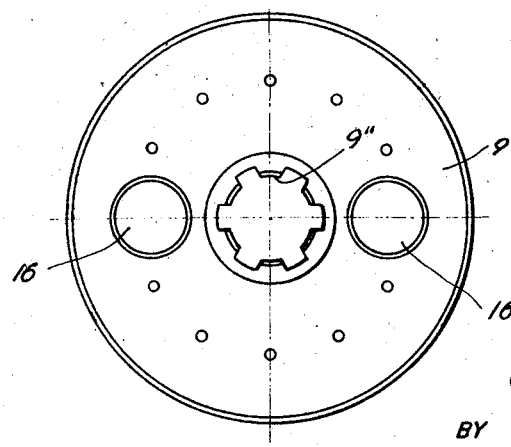

United States Patent Office 2,855,769
Patented Oct. 14, 1958

2,855,769

TORQUE LIMITERS WITH THERMAL RELEASE

Georges Garnier, Asnieres, France, assignor to Air-Equipement, Asnieres, France, a French company Application March 22, 1955, Serial No. 496,014

Claims priority, application France November 3, 1954

3 Claims. (Cl. 64—30)

This invention relates to torque limiters with thermal release of the type described in U. S. Patent No. 2,655,015, that is to say, to apparatus comprising, inserted between a set of friction discs and flexible means exercising pressure on the said discs, means of thermal release so arranged as to suppress the pressure on the discs when there is a temperature rise due to prolonged slipping of the said discs.

The above mentioned means of thermal release comprise two annular coaxial rings having different diameters and, normally in contact with each other, by two opposite edges, the ring of larger diameter having a high thermic expansion factor whereas the ring of smaller diameter has a low thermic expansion factor so that the larger of the ring can project beyond the other ring when said larger ring expands owing to a rise in temperature due to a prolongated slipping of the discs.

In apparatus of the above type, the difference between the outside diameter of the smaller ring and the inside diameter of the larger ring is only a few tens of millimetres, and experience has shown that after two or three releases the larger ring (generally of light, not very resistant metal) becomes worn by the passage of the smaller ring.

The purpose of this invention is to obviate the above drawbacks by means of some improvements.

A first improvement is that at least one of the annular discs, namely, the larger disc made of metal with a high thermal expansion factor, has a layer of hard metal (chromium, nickel, etc., for instance).

Another improvement is that the barrel in which the friction discs are housed comprises a drum with internal splines for the outside discs, and a hub which is welded to said drum (after the splines have been cut in the drum) the welding area of these two barrel parts having tapped holes for receiving safety screws which simultaneously serve to lock a plate which is screwed on the barrel hub and on which bear tightening springs insuring the pressure of the friction discs.

Another improvement is that the driving hub of the torque limiter, in addition to the splined part thereof intended to work in conjunction with corresponding splines of the driving shaft, has a cylindrical extension so arranged as to make a tight fit over a smooth part of the driving shaft, thus ensuring perfect centering.

This driving hub is advantageously formed of two concentric parts fitted together by shrink fit and made integral with each other (in rotation) by cotter pins working under shearing stress and located in holes cut partly in said hub parts.

The following description relates to one embodiment of the apparatus, the said embodiment being given merely by way of illustration and shown diagrammatically on the accompanying drawing, on which:

Fig. 8 is an axial cross-section showing the drum of the barrel;

Fig. 9 is an axial cross-section showing the hub of the barrel;

Fig. 10 is an axial cross-section of the barrel assembly;

Fig. 11, finally, is a plane view of Fig. 10.

Figure 1:
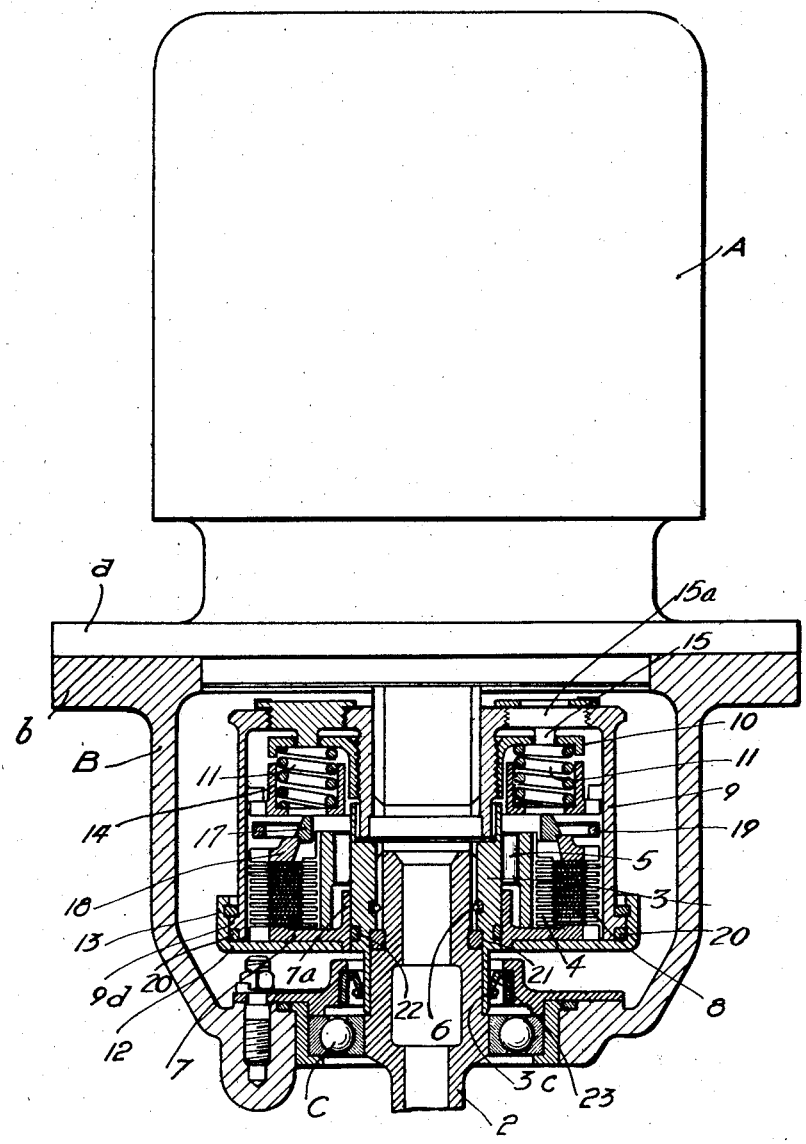
Fig. 1 is an axial cros-section of the torque limiter.

In Fig. 1 of the drawing, A is an accessory of which the shaft 1 is to be driven from the driving shaft 2 through the torque limiter of which the casing B has a flange $b$ on which is fixed the corresponding flange $a$ of the said accessory.

Figure 2:
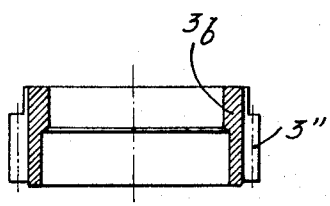
Fig. 2 is an axial cross-section showing one of the two parts constituting the driving hub of the apparatus.
Figure 3:
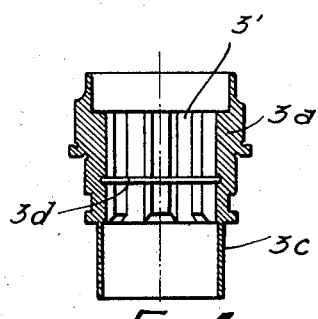
Fig. 3 is a similar view of the other part constituting said driving hub.
Figure 4:
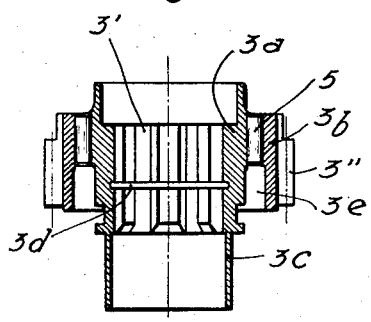
Fig. 4 is an axial cross-section of the driving hub assembly.

A driving hub 3, of which the inside splines 3' are engaged in the splines of the shaft 2, is mounted on that end of the shaft 2 which penetrates into the casing B in which it is centered by a ball bearing C, the said end being provided with driving splines. The hub 3 (see Figs. 2 to 4) is formed of two parts, namely, an inside part 3a having the above mentioned splines, and an outside part 3b with outside splines 3'' serving to drive the inside discs 4, the parts 3a and 3b being fitted together by a shrink fit and made integral with each other in rotation by cotter pins 5 working under shearing stress and engaged in holes cut off partly in each of the two-parts. This arrangement facilitates the machining of the splines 3' and 3'' which are made before assembly of the two components 3a and 3b.

To ensure proper centering of the hub 3 on the shaft 2, its part 3a has a cylindrical extension 3c, the bore of which corresponds to the diameter of that smooth part of the shaft 2 which is adjacent to the splined part of said shaft.

The hub 3 is held in its axial position on the shaft 2 by a cane washer 6 part of which penetrates into a circular groove 3d of the hub 3 and part into corresponding notches in the splines of the shaft 2.

In the annular space 3e arranged between the parts 3a and 3b of the hub 3, is housed the hub 7a of a bearing plate 7 constituting a stop for the series of friction discs comprising, in addition to the inside discs 4 (already mentioned above), the outside discs 8 alternating with the former and slipped into the inside splines 9' of the drum 9a forming one of the components of the barrel 9 (see, in particular, Figs. 8 to 10), the other component of which is constituted by the hub 9b with inside splines 9'' which engage with the splined end of the driven shaft 1.

The two components 9a and 9b of the barrel 9 are assembled by welding. By means of this arrangement, the cutting of the splines 9' (by means of a gear-cutting tool) is facilitated said cutting off being made before the assembling of the components.

The hub 9b has a thread 9c on which is screwed, for axial adjustment, the plate 10 on which bear the springs 11 pressing the discs 4 and 8 against the plate 7 held in the barrel by a flange-cover 12 which a cane washer 13 holds on a rib 9d of the barrel 9.

The springs 11 act on an annular tray 14 whose periphery has radial grooves engaged with the splines 9' of the barrel 9 so that the tray can slide axially while at the same time being integral in rotation with the barrel in question.

Locking of the adjustment plate 10, when in rotation, on the hub 9b is ensured by stop pins 15 which penetrate into holes of the plate 10 and which have threaded heads 15a screwed in tapped holes 16 of the barrel 9. The holes 16 of the barrel are pierced and tapped after assembly and welding (electrical) of the two components 9a and 9b, and the screws 15a ensure, in addition, reciprocal locking of the parts 9a and 9b if there is a failure in the weld.

Between the tray 14 and the series of friction discs are located on the one hand, the annular bearing ring 17 made of a metal with a low thermal expansion factor (steel for instance) and, on the other hand, the ring 18 made of metal with a high thermal expansion factor, aluminium for example, the latter ring having a greater diameter than the ring 17.

Figure 6:
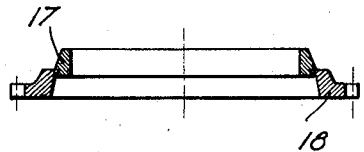
Fig. 6 is a cross-section of the release shims in normal operating position.
Figure 7:
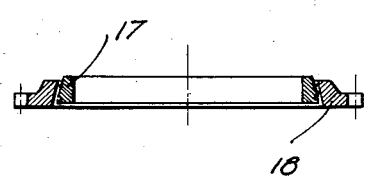
Fig. 7 is a cross-section of the release shims in the disconnected position.

At a normal temperature the two rings 17 and 18 are in contact with each other by their outside and inside edges respectively (Figs. 1 and 6). When, in consequence of prolonged slipping of the friction discs 4 and 8, the temperature rises above a predetermined limit, the ring 18, which expands more than the ring 17, escapes from the said ring 17 (Fig. 7). At this moment, the annular tray 14 moves forward, but its axial movement is stopped by a circular stop 19; on the other hand, the discs 4 and 8 being no longer tightened, the apparatus declutches.

In order to reduce the wear on the working edge of the ring 18, the latter has a hard metal (chromium, nickel, etc.) surface coating, which can be obtained, for example, by electrolytic deposit. Due to this metallisation, the apparatus can undergo a fairly large number of releases without necessitating replacement of the ring 18.

Figure 5:
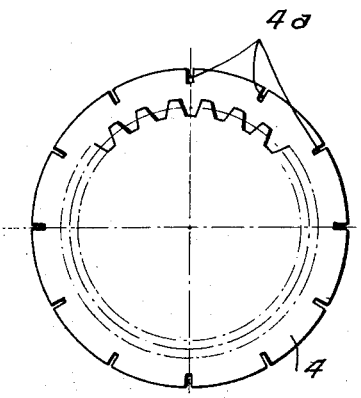
Fig. 5 is a view of an inside disc.

When prolonged slipping occurs, the inside discs 4 tend to buckle under the action of the rise in temperature. To obviate this, radial slots 4a are made in the periphery of the discs in question (Fig. 5). The behaviour of the discs (at the time of disengagement under load) is improved by a hardening treatment of the surface of the inside steel discs 4 and by making the outside discs 8 of bronze.

So that the apparatus retains its charge of lubricant there have been provided: a joint 20 between the cover-plate 12 and the rib 9d of the barrel 9; a joint 21 between the driving shaft 2 and the part 3a of the driving hub 3; and a joint 22 between the said part of the hub 3a and the hub 7a of the bearing plate 17. Finally, a joint 23 is placed between the casing B and the ground and smooth extension 3c of the hub 3.

It is obvious that the specimen embodiment of the improvements described above and shown on the accompanying drawings has been given solely by way of illustration and is in no way restrictive, and that any detail changes can be made therein without departing from the spirit of the invention.

What I claim is:

1. A torque limiter with thermal release comprising: a casing; a shaft penetrating into the said casing; a first series of discs so mounted on said shaft as to slide axially in relation to the said shaft and to participate in its rotation; a barrel coaxial with the said shaft; a second series of discs so arranged as to slide axially in relation to the said barrel and to be integral therewith in rotation, and inserted between the discs of the first series; elastic pressure means to tighten all the discs and make them integral with each other in rotation; and thermal means of release located on one side of the disc assembly and so adapted as to suppress the pressure on the discs when a temperature rise occurs due to prolonged slipping of the said discs, the said barrel comprising a drum with internal splines for the discs rotating with the barrel and a hub welded to the said drum and having inside splines to take a second shaft, the welding area of the drum and hub assembly comprising tapped holes and safety screws screwed in said holes, said torque limiter comprising, in addition, for the adjustment of the elastic means, a plate screwed on the hub of the barrel and locking members engaged with the said screw-on-plate, said locking members being the safety screws of the barrel.

2. In a torque limiter with thermal release comprising: a casing; a shaft penetrating into the said casing and having a splined end; a hub engaged with the splined end of the shaft; a first series of discs so mounted on said hub as to slide axially in relation to the said hub and to participate in its rotation; a barrel coaxial with the said shaft; a second series of discs so arranged as to slide axially in relation to the said barrel and to be integral therewith in rotation, and inserted between the discs of the first series; elastic pressure means to tighten all the discs and make them integral with each other in rotation; and thermal means of release intercalated between the disc assembly and the elastic means and so arranged as to suppress the pressure on the discs when a temperature rise occurs due to prolonged slipping of the said discs; said hub having: a central part with inside splines to engage with the splined end of the driving shaft; a peripheral part fitted over the central part and having outside splines to engage with the discs of the first series; and cotter pins working under shearing stress and located in holes cut out partly in the central part and partly in the peripheral part to make the central part and the peripheral part integral in rotation.

3. A torque limiter with thermal release comprising a casing, a shaft penetrating into the said casing, a first series of discs so mounted on said shaft as to slide axially in relation to the said shaft and to participate in its rotation, a barrel coaxial with the said shaft, a second series of discs so arranged as to slide axially in relation to the said barrel and to be integral therewith in rotation, and inserted between the discs of said first series, elastic pressure means to tighten all of said discs and to make them integral with each other in rotation, the said barrel comprising a drum with internal splines for the discs rotating with the barrel and a hub attached to the said drum and having inside splines to take a second shaft, the attaching area of the drum and hub assembly comprising tapped holes and safety screws screwed in said holes, said torque limiter further comprising for the adjustment of the elastic means a plate screwed on the hub of the barrel and locking members engaged with the said screwed-on plate, said locking members being the safety screws of said barrel, and thermal means of release located on one side of the disc assembly and so adapted as to suppress the pressure on the discs when a temperature rise occurs due to prolonged slipping of the said discs, the said means of release consisting of two metal rings coaxial with the driving shaft, one of the said rings having a large diameter and a relatively high coefficient of expansion while the other ring is made of a hard metal and has a relatively low coefficient of expansion and having a smaller diameter than said first ring, said other ring being normally in contact at its outside edge with the inside edge of the ring of large diameter, said latter ring being made of a relatively soft metal and having a hard-metal surface coating at least on that part thereof which works in conjunction with the other ring.

References Cited in the file of this patent

UNITED STATES PATENTS

| | | |
|---|---|---|
| 1,063,998 | Morse | June 10, 1913 |
| 2,655,015 | Linder | Oct. 13, 1953 |